United States Patent [19]

Heller et al.

[11] Patent Number: 4,898,928

[45] Date of Patent: * Feb. 6, 1990

[54] POLYACETAL AND POLYKETAL HYDROGELS FORMED FROM ACETALS OR KETALS AND POLYOLS

[75] Inventors: Jorge Heller, Woodside; Donald W. H. Penhale, Menlo Park; Steve Y. Ng, San Francisco, all of Calif.

[73] Assignee: Sandoz Pharmaceuticals Corp., E. Hanover, N.J.

[*] Notice: The portion of the term of this patent subsequent to Dec. 15, 2004 has been disclaimed.

[21] Appl. No.: 164,604

[22] Filed: Mar. 7, 1988

[51] Int. Cl.$^4$ .............................................. C08G 18/30
[52] U.S. Cl. ..................................... 528/392; 568/591; 568/598
[58] Field of Search .................. 528/392; 568/591, 598

[56] References Cited

U.S. PATENT DOCUMENTS 4,713,441 12/1987 Heller et al. ......................... 528/392

Primary Examiner—Maurice J. Welsh
Attorney, Agent, or Firm—Gerald D. Sharkin; Robert S. Honor; Walter F. Jewell

[57] ABSTRACT

Water-soluble polyacetal or polyketal having the formula

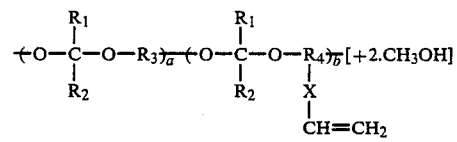

wherein $R_1$, and $R_2$ are aliphatic, cycloaliphatic or aromatic groups, for ketals; $R_1$ is hydrogen and $R_2$ is aliphatic, cycloaliphatic, or aromatic groups for acetals; $R_3$ and $R_4$ are also aliphatic, alkoxy, cycloaliphatic or aromatic groups X represents groups as $(CH_2)_n$, $O(CH_2)NO$ or

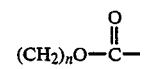

that connect the pendant unsaturation to the aliphatic, cycloaliphatic or aromatic $R^4$ groups, the ratio of a to b is 0.5 to 10, and n is 10–100.

17 Claims, No Drawings

POLYACETAL AND POLYKETAL HYDROGELS FORMED FROM ACETALS OR KETALS AND POLYOLS

TECHNICAL FIELD

This invention relates to water-soluble polyacetals and polyketals. In particular, this invention relates to water-soluble polyacetals and polyketals useful in the preparation of bioerodible hydrogels. More particularly, this invention relates to the controlled release of therapeutic macromolecules from bioerodible polyacetal and polyketal hydrogels.

When polyacetal or polyketal hydrogels containing therapeutic macromolecules are implanted in living mammals, they degrade releasing the macromolecules. The water-soluble degradation fragments, which are formed, are eliminated in the course of normal functions of the host mammals.

BACKGROUND ART

Controlled release methodologies may be conveniently classified as, diffusion controlled, solvent controlled or chemically controlled, depending upon the mechanism that controls the release of the therapeutic agent.

It is possible to utilize diffusion controlled or solvent controlled devices for the controlled release of macromolecules. However, such devices are nonerodible, so that systemic drug delivery from an implant site requires, first surgical implantation and then subsequent surgical removal of the expended device.

Attempts have been made to dispense therapeutic macromolecules from hydrogels. Because the bioerosion rate of the prior art hydrogels (such as hydrogels prepared by copolymerisation of N,N'-methylene-bisacrylamide and various water-soluble monomers) is extremely slow, there has been very poor control over the rate of therapeutic macromolecule delivery. Thus, as shown by the work of Torchilin et al. described in J. Biomed. Mater. Res., 11, 223–231 (1977), only hydrogels containing less than 1 weight percent crosslinker are bioerodible. Macromolecule release from such loosely crosslinked hydrogels occurs largely, if not solely, by diffusion, and almost 50% of the entrapped macromolecule is released in the first day of utilization.

In a recent patent (U.S. Pat. No. 4,502,976) Heller described a polyester hydrogel which represents a substantial improvement over the work reported by Torchilin et al. Heller states that the erosion rate and the concomitant release of incorporated macromolecules could be manipulated by simple changes in the chemical structure of the hydrogel.

Polycetals have been prepared by the condensation of polyols with carbonyl compounds, or by the self condensation of carbonyl compounds. N. G. Gaylord "Encyclopedia of Polymer Science and Technology, Interscience, N.Y. 1969 Vol. 10, p. 319.

Polyacetals have also been prepared by the reaction of divinyl ethers and polyols. Heller et al. J. Polymer Sci., Polymer Letters Ed. 18, 293 (1980).

French Patent No. 2,336,936, refers to crosslinked polyacetals formed by the condensation of diols or polyols with 3,4-dihydro-2H-pyran-2-ylmethyl-3,4-dihydro-2H-pyran-2-ylcarboxylate.

In a copending application Ser. No. 892,520 filed 8/1/86, now U.S. Pat. No. 4,713,441 Heller et al describes the preparation of polyacetal hydrogels from divinyl ethers and polyols.

However, the prior art is silent as to the preparation of polyacetal or polyketal from acetals of ketals and polyols hydrogels that can be subsequently crosslinked under mild conditions to entrap macromolecular therapeutic agents. These agents may then be released in a controlled manner as the hydrogel bioerodes.

SUMMARY OF THE INVENTION

This invention provides water-soluble polyacetals having molecular weights from about 5000 to about 30,000 which are formed by condensing three monomers. The first monomer may be an acetal or ketal. The second monomer may be a water-soluble polyglycol. The third monomer may be a diol containing an unsaturation which is either pendant, or part of the chain. Pendant unsaturation is preferred.

The formation of a linear, water-soluble polyacetal or polyketal where the liquid monomer contains pendant unsaturation may be represented as follows:

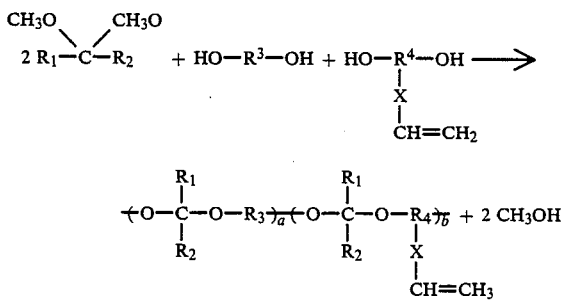

wherein $R_1$, and $R_2$ are aliphatic, cycloaliphatic or aromatic groups, for ketals; $R_1$ is hydrogen and $R_2$ is aliphatic, cycloaliphatic, or aromatic groups for acetals; $R_3$ and $R_4$ are also aliphatic, alkoxy, cycloaliphatic or aromatic groups. X represents groups such as $(CH_2)_n$, $O(CH_2)_nO$ or

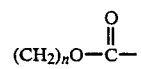

that connect the pendant unsaturation to the aliphatic, cycloaliphatic or aromatic $R^4$ groups, the ratio of a to b is 0.5 to 10, and n is 10–100.

Suitable monomers containing an R group are: R denotes a straight or branched chain divalent, trivalent or tetravalent alkylene radical of 2 to 10 carbon atoms inclusive such as 1,2-ethylene; 1,3-propylene; 1,2-propylene; 1,4-butylene; 1,5-pentylene; 1,6-hexylene; 1,2,5-hexylene; 1,3,6-hexylene; 1,7-heptylene; 2-methyl-1,7-heptylene; 1,8-octylene; 1,10-decylene; 2-propyl-1,6-hexylene; 1,1-dimethyl-1,6-hexylene; and the like. These alkylene chains are derived from the corresponding glycols.

The term alkenylene used for $R_3$ denotes an unsaturated straight or branched chain multivalent radical having 2 to 10 carbon atoms such as 1,4-but-2-enylene; 1,6-hex-3-enylene; 1,7-hept-3-enylene; 1,8-oct-3-enylene; 1,9-non-3-enylene; 4-propyl-(1,6-hex-3-enylene); 5-methoxy-(1,6-hex-3-enylene); 2-propenyl-(1,6-hex-3-enylene); and the like. The term cycloalkylene as used for $R_3$ includes monocyclic, lower cycloalkylene radicals of 3 to 7 carbons such as cyclopropylene; cyclobutylene; cyclopentylene; cyclohexylene and cycloheptylene. Similarly, the phrase cycloalkylene substituted with an alkyl of 1 to 7 carbons, an alkoxy of 1 to 7 carbons, or an alkenyl of 2 to 7 carbons, includes substituted cycloalkylenes such as 2-methyl-1,3-cyclopropylene; 2-methyl-1,4-cyclopentylene; 2-methyl-1,6-cyclohexylene; 2-ethoxy-2,3-cyclo-propylene; 5-butoxy-1,4-cyclopentylene; 2-methoxy-1,4-cyclohexylene; 2-propenyl-1,5-cyclopentylene; 2-isobutenyl-1,6-cyclohexylene; and the like.

Exemplary $R_3$ cycloalkenylene and $R_3$ cycloalkenylene substituted with an alkyl of 1 to 7 carbons, an alkoxy of 1 to 7 carbons, or an alkenyl of 2 to 7 carbons, include monocyclic alkenylenes having from 4 to 7 carbons as ring members, such as 1,4-cyclopent-2-enylene; 1,5-cyclopent-3-enylene; 1,6-cyclohex-2-enylene; 1,6-cyclohex-2-enylene; and the substituted rings such as 5-methyl-(1,4-cyclopent-2-enylene); 6-ethyl-(1,4-cyclohex-2-enylene); 6-ethoxy-(1,5 cyclohex-2-enylene); 2-propyl-(1,5-cyclohex-3-enylene); 2-methoxy-(1,4-cyclohex-2-enylene); 2-methoxy-(1,4cyclohept-2-enylene), and the like.

The expressions $R_3$ arylene and $R_3$ arylene substituted with an alkyl of 1 to 7 carbons, an alkenyl of 2 to 7 carbons, or an alkoxy of 1 to 7 carbons, include the benzenoid groups such as phenylene, phenylalkylene and phenylalkenylene. Typical groups are 1,4-phenylene; 1,4-phenyldimethylene; 1,4-phenyldiethylene; 2,ethyl-1,4-phenyldimethylene; 2-methyl-1,4-phenyldimethylene; 2-methoxy-(1,4-phenyldimethylene); 2-propyl-(1,4-phenyldiethylene); and the like.

Suitable monomers containing an $R^3$ group are shown in Table I under acetals and ketals.

Suitable monomers containing an $R^4$ group are shown in Table I under unsaturated diols.

The water-soluble polyacetal or polyketals may be prepared by dis-solving the three monomers in a solvent, such as benzene, toluene or tetrahydrofuran which form an azetrope with the evolved alcohol. A small amount of an acidic catalyst, such as p-toluenesulfonic acid is added, and the evolved alcohol is removed. The resulting water-soluble linear polyacetal or polyketal is isolated by evaporating the solution.

The monomer mixtures may be prepared such that the number of terminal hydroxyl groups in the monomers containing $R^3$ and $R^4$ groups is equal to the number of methoxy groups in monomer containing the $R_1$ and $R_2$ groups. In this manner the highest molecular weight water-soluble linear polyacetal or polyketal is obtained. In some instances it may be advantageous to limit the molecular weight of the water-soluble, linear polyacetal or polyketal. This can be readily achieved by having an excess of the hydroxyl group relative to the methoxy groups, or having an excess of the methoxy groups reactive to the hydroxyl groups.

The unsaturated, linear, water-soluble polyacetals or polyketals may be converted to hydrogels by (1) connecting the linear chains of the water-soluble polyacetals or polyketals through the double bonds using free radial initiation, or (2) by using free a radical initiator to copolymerize the double bonds in the water-soluble polyacetal or polyketal with a monomeric compound having a reactive double bond. Although formation of a three dimensional network can be achieved in suitable organic solvents, it is particularly advantageous to carry out this network formation in an aqueous environment. When network formation is carried out by a copolymerization with a monomeric compound containing a reactive double bond, the water-soluble linear polyacetal or polyketal is connected by the short chains of the copolymerized monomeric compound.

The crosslink density of the hydrogel is determined by the number of double bonds in the linear, water-soluble polyacetal or polyketal, and can be readily controlled by varying the ratio of monomers with $R^3$ and $R^4$ groups. Referring to the schematic representation of the water-soluble linear polyacetal or polyketal, the crosslink density is controlled by the ratio of a to b. In a system where the hydrogel is formed by copolymerization of the water-soluble, linear polyacetal with a monomeric compound having a double bond, an additional degree of freedom is available in that the amount of monomeric compound having a double bond used relative to the total number of double bonds in the water-soluble linear polyacetal determines the length of the chains connecting the linear polyacetal.

Macromolecular therapeutic agents are readily incorporated into the polymer to form bioerodible masses of polymer in which the therapeutic agent is entrapped by carrying out the polymerization reaction of the dissolved monomers in the presence of the dissolved macromolecule. Such a process is particularly advantageous because it is carried out at essentially room temperature in water at an essentially neutral pH so that even the most sensitive macromolecules can be safely entrapped in the hydrogel without any danger of loss of activity due to denaturing. When these masses are implanted in a mammal, slow hydrolysis of the polymer mass occurs with continous slow release of the therapeutic material at a locus in the mammal at which its function is required.

To form these masses the macromolecular therapeutic agent is dissolved in a buffer solution which is close to the neutral point. An appropriate amount of the polyacetal prepared as described above is dissolved in the buffer solution, which is then stripped of any contained oxygen by bubbling nitrogen or argon through it. Crosslinking is initiated by adding a small amount of a redox catalyst, such as ammonium peroxydisulfate. The crosslinking reaction proceeds rapidly, and can be made more rapid by addition of an accelerator, such as ferrous ammonium sulfate or N,N,N',N'-tetramethylethylenediamine. If desired, a crosslinking agent, such as N-vinylpyrrolidone or acrylamide, can be added to the solution prior to the addition of the redox initiator. The crosslinked polymer containing entrapped therapeutic material can be put into any desired form; for example, it may be poured onto a glass plate and the water evaporated, leaving the film of entrapped therapeutic agent or it may be dispersed in hexane or other organic solvent and agitated with the result that microspheres of the entrapped therapeutic agent are formed. The microspheres may be injected into a mammal requiring treatment.

TABLE 1

STRUCTURES OF UNSATURATED DIOLS

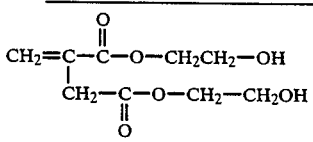

Compound I

TABLE 1-continued

| | |
|---|---|
| HO—CH₂—CH—OH<br>           CH₂<br>           O—CH₂—CH=CH₂ | Compound II |
| HO—CH₂—CH—OH   O<br>           CH₂—O—C—CH=CH₂ | Compound III |
| HO—CH₂—CH=CH—CH₂—OH | Compound IV |

STRUCTURES OF ACETALS AND KETALS

| | |
|---|---|
|      OCH₃<br>CH₃—C—CH₃<br>     OCH₃ | Compound V |
| CH₃O   OCH₃<br>    ⬠ | Compound VI |
| CH₃O   OCH₃<br>    ⬡ | Compound VII |
|              OCH₃<br>CH₃—CH₂—CH₂—C—CH₃<br>             OCH₃ | Compound VIII |
| CH₃O  OCH₃<br>    C<br>Ph   Ph | Compound IX |
| CH₃O  OCH₃<br>    C—CH₃<br>  Ph | Compound X |
|         OCH₃<br>CH₃—CH₂—C—H<br>        OCH₃ | Compound XI |
|      OCH₃<br>⬡—C—H<br>     OCH₃ | Compound XII |
|      OCH₃<br>CH₃—C—H<br>     OCH₃ | Compound XIII |
|      OCH₃<br>Ph—C—H<br>     OCH₃ | Compound XIV |

DETAILED DESCRIPTION OF THE INVENTION

In the following examples detailed description of the preparation of water-soluble polyacetals or polyketals of the invention are provided and their use in incorporating macromolecules in the polymer are described.

EXAMPLE 1

In a 250 ml round bottom flask were placed 5.20 grams (0.05 moles) of Compound V, 21.89 grams (0.035 moles) of polyethylene glycol having a molecular weight of 625, 3.28 grams (0.015 moles) of Compound I, 80 ml cyclohexane and 5 mg p-toluenesulfonic acid. The mixture was refluxed under argon for 30 min. at an oil bath temperature of 105° C. The methanol formed during the reaction was removed by azeotropic distillation with cyclohexane over a period of 2 hours. Residual solvent was removed by roto-evaporation and pumping under vacuum. The product was a water-soluble syrupy liquid. In this polymer the ratio of saturated to unsaturated diol is 2.33.

EXAMPLE 2

Following the procedure of Example 1 a polymer was prepared using 5.20 g (0.05 moles) of Compound V, 15.62 g (0.025 mole) of polyethylene glycol having a molecular weight of 625 and 5.45 g (0.025 mole) of Compound I. In this polymer the ratio of saturated to unsaturated diol is 1:1

The structure of polymers described in Examples 1 and 2 are:

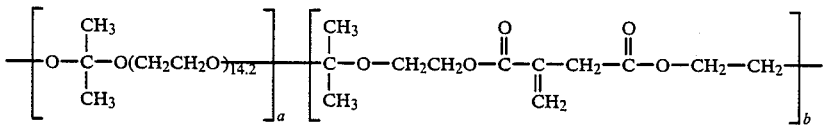

EXAMPLE 3–7

Following the procedure of Example 1 but replacing Compound V with: Compound VI, Compound VII, Compound VIII, Compound IX, and Compound X, the following polymers are formed:

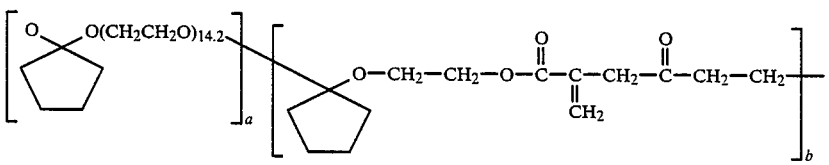

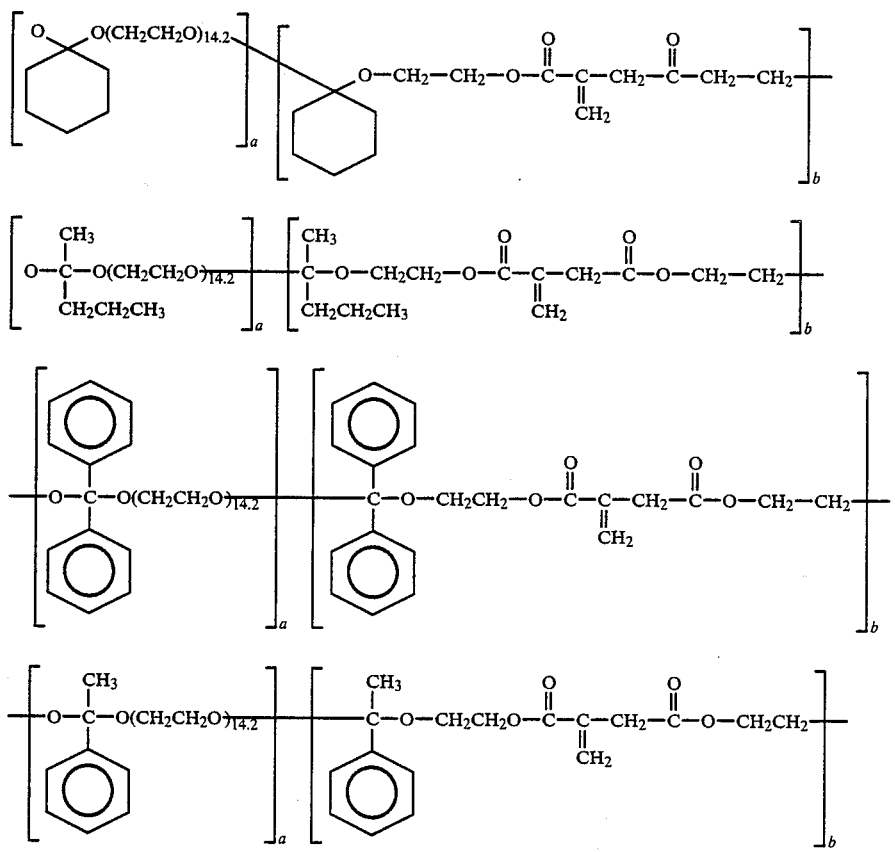
EXAMPLE 8-11
Following the procedure of Example 1, but replacing Compound V with: Compound XI, Compound XII, Compound XIII and Compound XIV, the following polymers are formed:
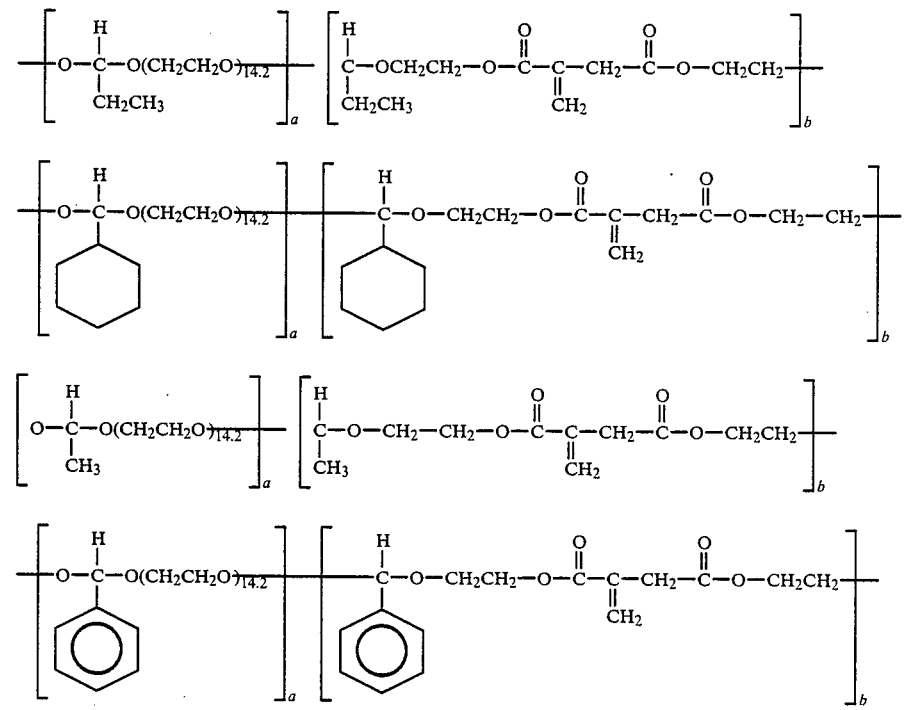

EXAMPLE 12

Using the same conditions as in Example 1 6.50 g (0.01 mole) of Compound VI, 21.89 g (0.035 mole) of polyethylene glycol having a molecular weight of 625 and 2.19 g (0.015 mole) of Compound III was allowed to react. Because of the high reactivity of the acrylic double bond, hydroquinone or other free radical inhibitors must be added to the reaction mixture to prevent crosslinking during the polymerization step.

The isolated polymer had the following structure:

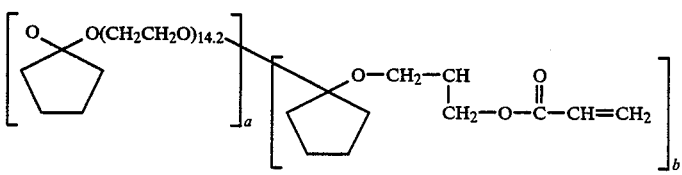

EXAMPLES 13, 14

Following the procedure of Example 1 but replacing Compound I with Compounds II and Compound IV, the following polymers are formed:

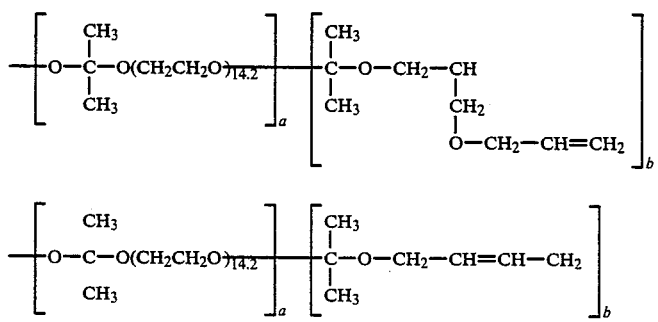

EXAMPLE 15

Bovine serum albumin was incorporated into the polymer of Example 1 according to the following procedure. In an 8-dram vial with a magnetic stirrer were placed two grams of polymer followed by 5 ml of pH 7.4 phosphate buffer, 1 ml pH 8.6 tris buffer and 1 ml of 1.12% aqueous N,N,N',N'-tetramethylethylenediamine. Next, 2 wt % of bovine serum albumin was added and the solution purged with argon for 30 minutes.

Polymerization was initiated by the addition of 1 ml of an argon-purged 12.5% solution of ammonium peroxydisulfate. After stirring the vial was placed in a bath maintained at 37° C. Gellation occured after 30 minutes.

The gel can be prepared in sheet form by pouring the final solution on a glass plate, placing four shims of the desired thickness around the glass plate and placing a second glass plate on top of the shims. The clamped glass plates are placed in a 37° C. oven for 30 minutes, the plates disassembled and the film removed. It can then be cut to the desired shapes.

EXAMPLE 16

Bovine serum albumin can also be incorporated into the polymer of Example 1 and converted to small beads according to the following procedure. A polymerization mixture identical to that described in Example 10 was prepared and then added dropwise to 100 milliliters of rapidly stirred n-hexane containing 4 milliliters of sorbitan sesquioleate (a surfactant sold by I.C.I. Chemicals under the tradename "Arlacel C"). The system was then brought to 37° C. on a water bath and maintained at that temperature for 30 minutes with continued stirring and under a nitrogen purge. The microparticles were then partially dehydrated by an addition of 100 milliliters of absolute ethanol, the hexane was decanted off, and the solution was vacuum filtered and dried overnight in a vacuum desiccator over anhydrous $P_2O_5$.

Very fine, uniform, and free-flowing particles were obtained. To use in mammals, they can be resuspended in saline and injected with a 22-gauge hypodermic needle.

EXAMPLE 17

Bovine serum albumin was incorporated into the polymer of Example 1 according to the following procedure. In an 8-dram vial with a magnetic stirrer were placed two grams of polymer and for a typical formulation with 40 wt% of a water-soluble monomeric compound having a reactive double bond, 800 mg of N-vinylpyrrolidone was also added, followed by 5 ml of pH 7.4 phosphate buffer, 1 ml pH 8.6 tris buffer and 1 ml of 1.12% aqueous N,N,N',N'-tetramethylethylenediamine. Next, 2 wt% of bovine serum albumin was added and the solution purged with argon for 30 minutes.

Polymerization was initiated by the addition of 1 ml of an argon-purged 12.5% solution of ammonium peroxydisulfate. After stirring the vial was placed in a bath maintained at 37° C. Gellation occured after 30 minutes.

The gel can be prepared in sheet form by pouring the final solution on a glass plate, placing four shims of the desired thickness around the glass plate and placing a second glass plate on top of the shims. The clamped glass plates are placed in a 37° C. oven for 30 minutes, the plates disassembled and the film removed. It can then be cut to the desired shapes. Alternately, the general procedure described in Example 10 can be used.

What is claimed is:

1. Water-soluble polyacetal or polyketal having the formula

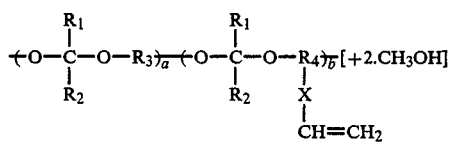

wherein $R_1$, and $R_2$ are aliphatic, cycloaliphatic or aromatic groups, for ketals; $R_1$ is hydrogen and $R_2$ is aliphatic, cycloaliphatic, or aromatic groups for acetals; $R_3$ and $R_4$ are also aliphatic, alkoxy, cycloaliphatic or aromatic groups [.] X represents groups [such] as $(CH_2)_nO$ or

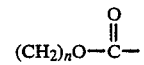

that connect the pendant unsaturation to the aliphatic, cycloaliphatic or aromatic $R^4$ groups, the ratio of a to b is 0.5 to 10, and n is 10–100.

2. The compound according to claim 1 which is

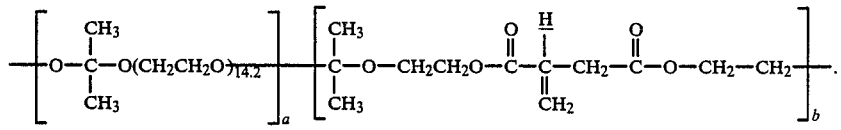

3. The compound according to claim 1 which is

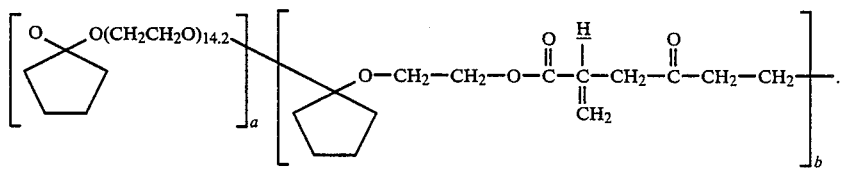

4. The compound according to claim 1 which is,

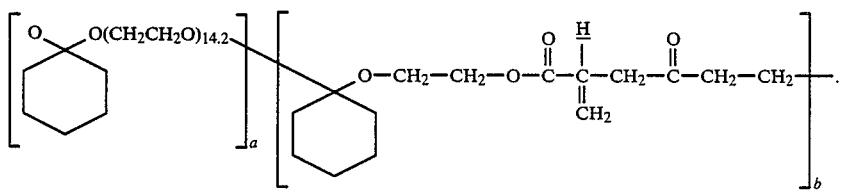

5. The compound according to claim 1 which is,

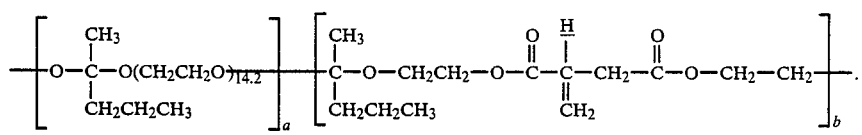

6. The compound according to claim 1 which is,

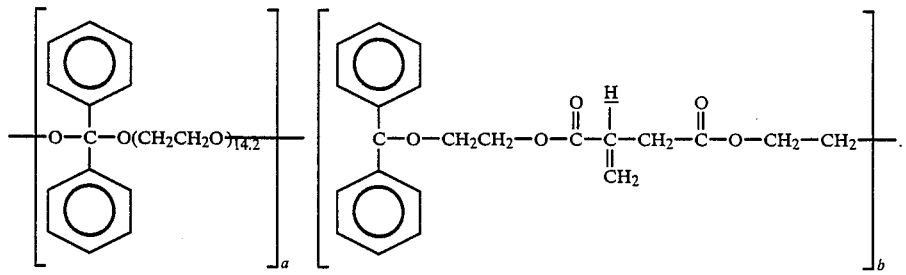

7. The compound according to claim 1 which is,

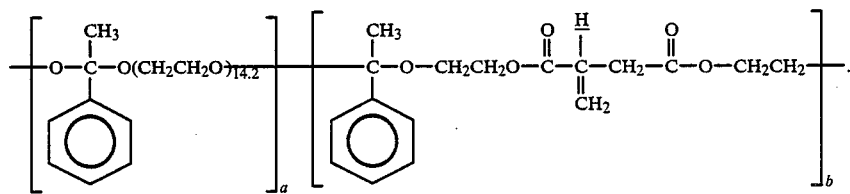
8. The compound according to claim 1 which is,
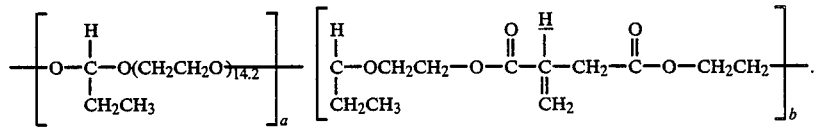
9. The compound according to claim 1 which is,
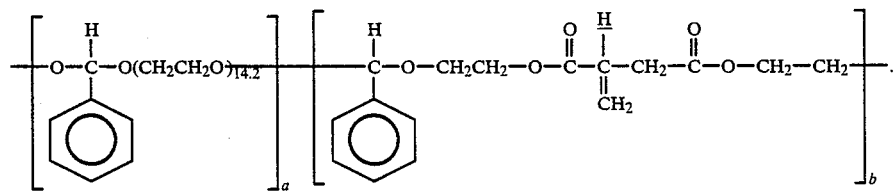
10. The compound according to claim 1 which is,
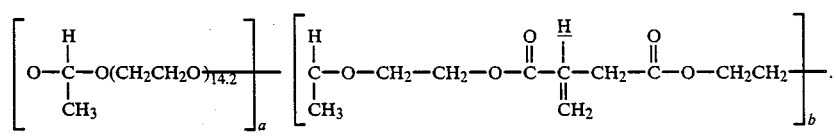
11. The compound according to claim 1 which is,
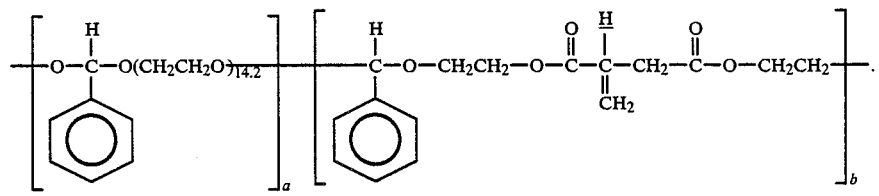
12. The compound according to claim 1 which is,
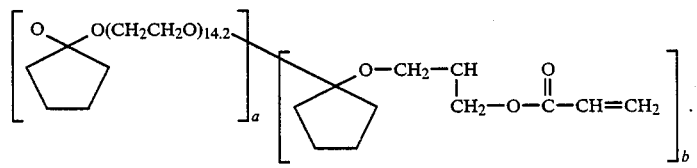
13. The compound according to claim 1 which is,
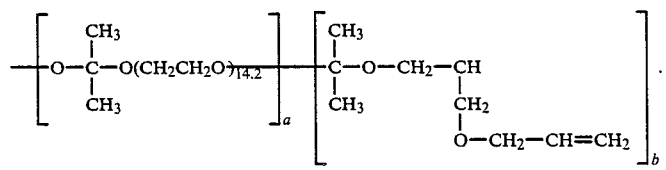
14. The compound according to claim 1 which is,

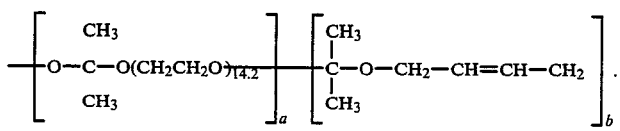

15. A method of preparing a water-soluble polyacetal or polyketal of claim 1, wherein monomers of the formula

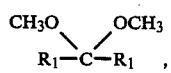

HO—$R^3$—OH and

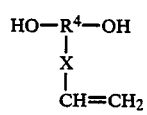

are dissolved in a polar solvent in the presence of an acidic catalyst, and then evaporating the solvent to recover the polyacetal or polyketal, wherein $R^1$, $R^2$, $R^3$, $R^4$ and X are as defined in claim 1.

16. A method of incorporating a therapeutic macromolecular agent in a crosslinked polyacetal or polyketal of claim 1 which comprises dissolving the agent and a polyacetal or polyketal in an essentially neutral buffer solution in the presence of a crosslinking agent to entrap the therapeutic agent in the crosslinked polyacetal or polyketal.

17. A method of releasing a therapeutic macromolecular agent from a crosslinked polyacetal or polyketal of claim 1, which comprises implanting the therapeutic agent containing polyacetal or polyketal in a host, and bioeroding the polyacetal or polyketal over a period of time to release the therapeutic agent in the host tissues.

* * * * *